United States Patent
Kang

(10) Patent No.: US 9,679,001 B2
(45) Date of Patent: Jun. 13, 2017

(54) CONSENSUS SEARCH DEVICE AND METHOD

(71) Applicant: Korea University Research and Business Foundation, Seoul (KR)

(72) Inventor: Jaewoo Kang, Gyeonggi-do (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 133 days.

(21) Appl. No.: 13/899,786

(22) Filed: May 22, 2013

(65) Prior Publication Data

US 2013/0254209 A1 Sep. 26, 2013

Related U.S. Application Data

(63) Continuation of application No. PCT/KR2011/008916, filed on Nov. 22, 2011.

(30) Foreign Application Priority Data

Nov. 22, 2010 (KR) .................. 10-2010-0116421

(51) Int. Cl.
G06F 17/30 (2006.01)

(52) U.S. Cl.
CPC .. G06F 17/30321 (2013.01); G06F 17/30616 (2013.01); G06F 17/30672 (2013.01)

(58) Field of Classification Search
USPC ........................................................ 707/741
See application file for complete search history.

(56) References Cited

U.S. PATENT DOCUMENTS

| 7,895,197 | B2* | 2/2011 | Meyer et al. ................. 707/728 |
| 2003/0042319 | A1* | 3/2003 | Moore ........................... 235/494 |
| 2004/0199419 | A1* | 10/2004 | Kim ....................... G06Q 30/02 |
| | | | 705/26.1 |
| 2005/0027704 | A1* | 2/2005 | Hammond ........ G06F 17/30699 |
| 2005/0234877 | A1* | 10/2005 | Yu ..................................... 707/3 |
| 2006/0020607 | A1* | 1/2006 | Patterson ...................... 707/100 |
| 2009/0063426 | A1* | 3/2009 | Crouch et al. .................... 707/3 |
| 2009/0187559 | A1* | 7/2009 | Gloor et al. ....................... 707/5 |

(Continued)

FOREIGN PATENT DOCUMENTS

| KR | 10-2001-0015368 A | 2/2001 |
| KR | 10-2007-0050305 A | 5/2007 |

OTHER PUBLICATIONS

International Search Report for PCT/KR2011/008916 dated May 22, 2012.

*Primary Examiner* — Kris Mackes
*Assistant Examiner* — Allen Lin
(74) *Attorney, Agent, or Firm* — Pearne & Gordon LLP

(57) ABSTRACT

A consensus search device is provided, which includes a semantic data indexing unit configured to divide text data of an electronic document written about at least one object into segments, to extract at least one semantic descriptor from the each segmented text data, and to generate a semantic data index matching each of the extracted semantic descriptor to the object and the each segmented text data. The consensus search device also includes a semantic searching unit configured to retrieve an object related to a query, based on the semantic data index. The text data is divided into the segments by units of meaning.

16 Claims, 7 Drawing Sheets

(56) References Cited

U.S. PATENT DOCUMENTS

2010/0268702 A1* 10/2010 Wissner ............ G06F 17/30705
707/711
2011/0276580 A1* 11/2011 Press et al. ................... 707/759

* cited by examiner

FIG. 4

Kinght and Day
-First paragraph of synopsis
1. Knight and Day follows the adventure of Roy Miller(Tom Cruise), a rogue spy, and June Havens(Cameron Diaz), a car restorer.
2. We see Miller watching Havens, and he bumps into her a couple of times as they go through security at Wichita Airport.
3. Havens is making her way back home to Boston from Wichita after picking up spare parts for her deceased father's classic GTO car, which she is restoring for her sister as a wedding gift.
--User Review 1--
7. Knight and Day is comfort food movie. It's a pleasant diversion, a fun time at the cinema that doesn't ask a lot of it's audience and offers an enjoyable ride.
8. We've seen it all before, but it worked pretty well then, and it works pretty well now.
--User Review 2--
9. I just came back from an advanced screening of "Knight and Day" and I have to say, I was extremely impressed.
10. I, as well as you, are tired of formulaic Hollywood movies that are disposable and provide little to no new elements to the table.
12. For starters, the action is quite remarkable and pretty dam satisfying.
13. And the movie was just hilarious and had great comic timing
14. It should mean something when I tell you that the crowded audience was laughing
15. Not just a few people, the WHOLE audience and they took up almost all the seats.

Inception
-First paragraph of synopsis-
1. Dom Cobb is a skilled thief, the absolute best in the dangerous art of extraction, stealing valuable secrets from deep within the subconscious during the dream state, when the mind is at its most vulnerable.
2. Cobb's rare ability

FIG. 5

| OBJECT | ID |
|---|---|
| A | M1042 |
| B | M1043 |
| C | M1044 |
| D | M1045 |

(A)

| SEMANTIC DESCRIPTOR | | | | |
|---|---|---|---|---|
| Wichita | M1043, [2,3] | | | |
| Audience | M1043, [7,14,15] | M1044, [5] | | |
| Great | M1042, [9] | M1043, [13] | M1044, [1,3] | M1045, [4] |
| Twist | M1042, [13] | M1043, [11] | M1045, [3] | |
| Flight | M1043, [4,5,6] | | | |
| Christopher Nolan | M1042, [6,9,12] | M1045, [1] | | |
| Perfect | M1042, [5,7] | M1044, [2,4] | M1045, [2] | |
| Steal | M1042, [1,5] | | | |
| Mind | M1042, [1,12,12] | M1044, [1,4] | | |

(B)

| SEMANTIC DESCRIPTOR | | | |
|---|---|---|---|
| Tom | M1042, [5] | M1043, [2,13] | |
| Cruise | M1042, [5,10,14] | M1043, [2,13] | |
| movie | M1043, [2,13,15] | M1044, [5] | |
| date | M1043, [2,13] | M1044, [1,3] | M1045, [4] |
| film | M1042, [5,13] | M1045, [3] | |
| motion-picture | M1043, [4,5,6] | | |
| go out | M1042, [5,9,12] | M1045, [1] | |

CONSENSUS SEARCH DEVICE AND METHOD

TECHNICAL FIELD

The present disclosure relates to a consensus search device and method for searching for consensus according to search conditions.

BACKGROUND ART

With increasing desires of users to search for various digital contents, products or social issues, many web sites providing search functions, such as search portals, are providing semantic search in order to allow users to search for desired contents more accurately.

In conventional ways to provide semantic search, in general, contents are searched for based on factual information such as tags and metadata provided by content providers. For example, digital contents like videos can be searched based on descriptors directly extracted from the contents via scene analysis, line extraction, sound and voice classification, and so forth.

In such conventional methods of contents-based semantic search, however, it may be very difficult to model knowledge in a certain domain sufficiently. Furthermore, since the contents are searched for merely based on the factual descriptors created by the content providers or based on the limited descriptors extracted from the contents themselves, the likelihood is high that contents that are not intended by the users are retrieved.

That is, the conventional methods of implementing the content-based semantic search service have a drawback that a limited and inaccurate search result may be provided in response to a user's search request due to the lack of information data to be used for the search for the desired contents.

Further, recently, as SNS (Social Network Service) is widely used, electronic documents containing a wide variety of opinions about various objects including digital contents, products and social issues are being accumulated more and more. However, No method so far can provide a search that makes sufficient use of those various opinions.

DISCLOSURE OF THE INVENTION

Problems to be Solved by the Invention

In view of the forgoing problems, the present disclosure provides a consensus search device and method capable of improving the accuracy of search by utilizing various opinions of users about objects described in electronic documents.

Means for Solving the Problems

According to one aspect of the present inventive concept, a consensus search device includes a semantic data indexing unit configured to divide text data of an electronic document written about at least one object into segments, to extract at least one semantic descriptor from the each segmented text data, and to generate a semantic data index matching each of the extracted semantic descriptor to the object and the each segmented text data. The consensus search device also includes a semantic searching unit configured to retrieve an object related to a query, based on the semantic data index. The text data is divided into the segments by units of meaning.

According to another aspect of an illustrative embodiment of the present inventive concept, a method for generating an index for consensus search includes dividing text data of an electronic document written about at least one object into segments; extracting at least one semantic descriptor from the each segmented text data; and generating a semantic data index matching each of the extracted semantic descriptor to the object and the each segmented text data. The text data is divided into the segments by units of meaning.

According to still another aspect of an illustrative embodiment of the present inventive concept, a consensus search method includes providing a semantic data index by dividing and indexing an electronic document describing at least one object into segments, and retrieving an object related to a query based on the semantic data index. The semantic data index is generated by extracting at least one semantic descriptor from the each segmented text data, and matching each of the extracted semantic descriptor to the object and the each segmented text data.

Effect of the Invention

One of the advantages of the present inventive concept is that search results more adequate for a query can be provided by using text data generated by various users for each object. That is, compared to conventional semantic search methods which perform a search based only on factual information of contents, embodiments of the present inventive concept can retrieve contents closer to the intended meaning of search keywords or query given by a user, improving the accuracy of the search results. Especially, it is possible to provide, on a real time basis, the best results for a subjective query, such as asking opinions on a certain object, to which no clear and accurate answer exists, by comprehensively using various on-line opinions.

BRIEF DESCRIPTION OF THE DRAWINGS

FIG. 4 is a diagram for describing an exemplary structure of semantic segments in accordance with an illustrative embodiment.

FIG. 5 provides diagrams illustrating semantic data indices in accordance with an illustrative embodiment.

BEST MODE FOR CARRYING OUT THE INVENTION

Figure 1:
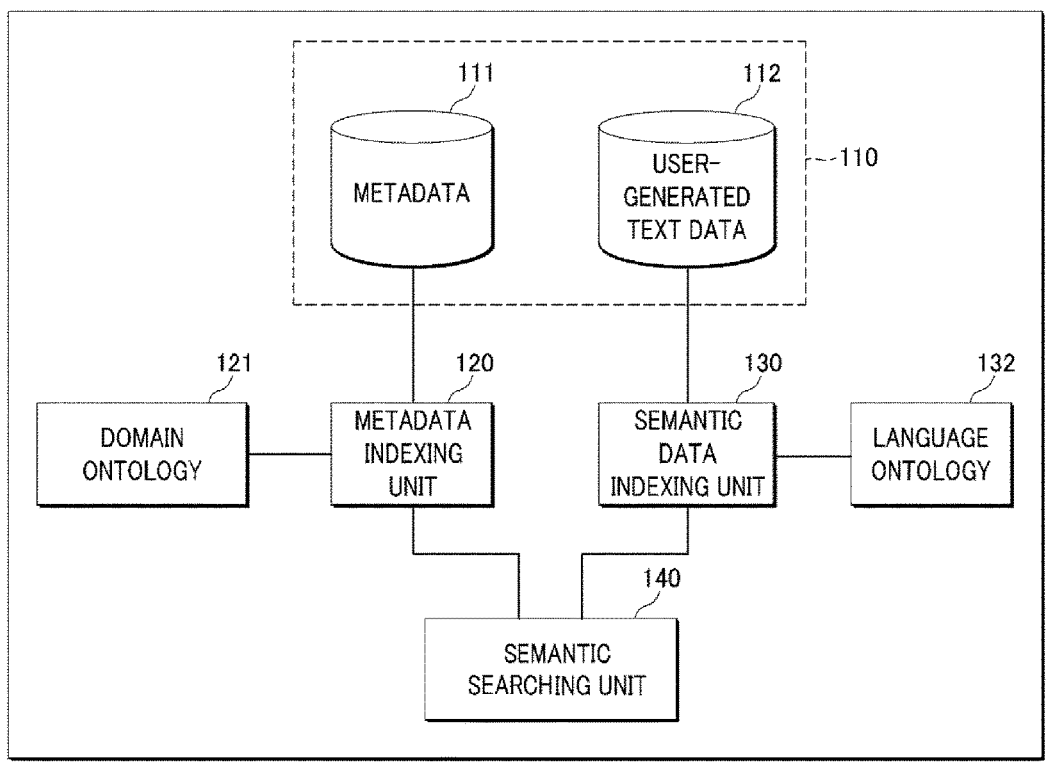
FIG. 1 is a block diagram illustrating a configuration of a consensus search device in accordance with an illustrative embodiment.

Hereinafter, illustrative embodiments and examples will be described in detail so that inventive concept may be readily implemented by those skilled in the art. However, it is to be noted that the present disclosure is not limited to an illustrative embodiment of the present inventive concepts and examples but can be realized in various other ways. In drawings, parts not directly relevant to the description are omitted to enhance the clarity of the drawings, and like reference numerals denote like parts through the whole document.

Through the whole document, the terms "connected to" or "coupled to" are used to designate a connection or coupling of one element to another element and include both a case where an element is "directly connected or coupled to" another element and a case where an element is "electronically connected or coupled to" another element via still another element. Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "object" is used to represent the topic or entity that a user intends to describe in an electronic document. A single electronic document may include one or more objects. The object may be one of various types of named entities such as a product, a service, a person, a company, a region, a social issue, and so forth.

Through the document, the term "consensus search" means a search method of returning the best results for a subjective query, such as a question for asking opinions upon a certain object, to which no clear and correct answer exists, by comprehensively using various on-line opinions.

FIG. 1 is a block diagram illustrating a configuration of a consensus search device in accordance with an illustrative embodiment.

Figure 2:
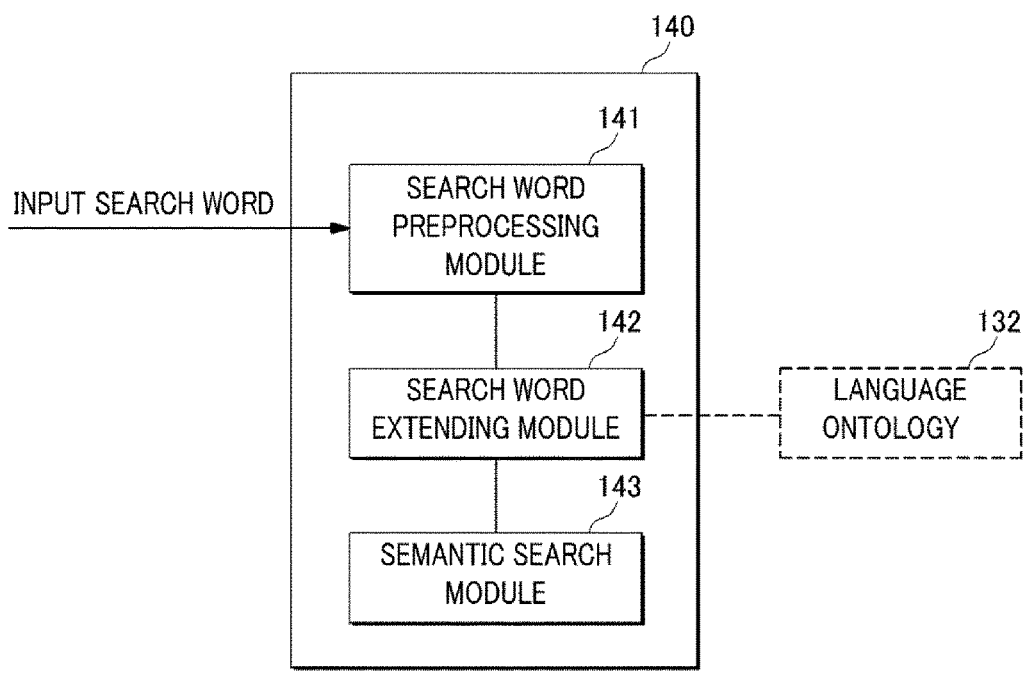
FIG. 2 is a block diagram illustrating a semantic searching unit in accordance with an illustrative embodiment.

FIG. 2 is a block diagram illustrating a semantic searching unit in accordance with an illustrative embodiment.

As depicted in FIG. 1, a consensus search device 100 in accordance with an illustrative embodiment may include database 110 including metadata 111 and user generated text data 112, a metadata indexing unit 120, a domain ontology 121, a semantic data indexing unit 130, a linguistic ontology 132 and a semantic searching unit 140. In other words, the consensus search device 100 may include database 110 and a processor for performing consensus search. The metadata 111 is generated for various objects described in various types of electronic documents, such as web pages and SNS messages.

That is, the metadata 111 stored in the database 110 is factual information defined for objects. By way of example, in the case that the object described in an electronic document falls into a category of "movie," the metadata may include pieces of factual information including the director, the release date, and the film distributor of the movie. That is, the metadata may include at least one factual descriptor describing the content or the object. The database 110 in accordance with an illustrative embodiment of the present inventive concept may be in the form of a database in which metadata 111 existing on the web are acquired and stored for each object, or in the form of a module configured to search, acquire, collect, and provide the metadata whenever needed.

The user-generated text data 112 stored in the database 110 is a collection of text data generated (written) by a user who has experienced one of various object. By way of example, in case that the category of an object is "movie," the user-generated text data may be text data such as reviews or comments that a number of users have created on a bulletin board on a website, blogs or SNS messages providing information about movies.

The user-generated text data may be about any objects such as products and services about which users can create subjective information such as opinion or review in the form of text data, as well as multimedia contents (e.g., movie, music, story, photo, etc.) retrievable on webs. That is, in accordance with an illustrative embodiment of the present inventive concept, the user-generated text data is in the form of a document including at least one sentence, and the present disclosure is applicable to any objects about which such user-generated text data exist.

Further, the database 110 in accordance with an illustrative embodiment of the present inventive concept may be in the form of a database in which some acquired user-generated text data 112 are stored for each object and may be in the form of a module configured to search, acquire, collect, and provide user-generated text data for a certain object whenever needed.

The database 110 may include a web crawler. The web crawler may be configured to visit a web site on the web using a preset address and generate user-generated text data by crawling documents on the web site. The crawler collects certain information from the web pages. The crawler in accordance with an illustrative embodiment of the present inventive concept may be configured to collect and store text data uploaded onto a bulletin board or the like on a web site dealing with a specific topic (e.g., a web site or a blog about movies).

The metadata indexing unit 120 may be configured to acquire metadata for each object from the database 110, map the acquired metadata on a domain ontology corresponding to the category of each object, and generate a metadata index using the domain ontology on which each metadata is mapped. The ontology is a kind of dictionary composed of words and their relations. In the domain ontology 121, words related to a specific domain (field or area) are hierarchically arranged, and inference rules that can be used for expansion may additionally be included. The domain ontology 121 can be used to deal with web-based knowledge or to share or reuse knowledge among applications. The domain ontology 121 in accordance with an illustrative embodiment may be predefined and stored for each category of objects.

Figure 3:
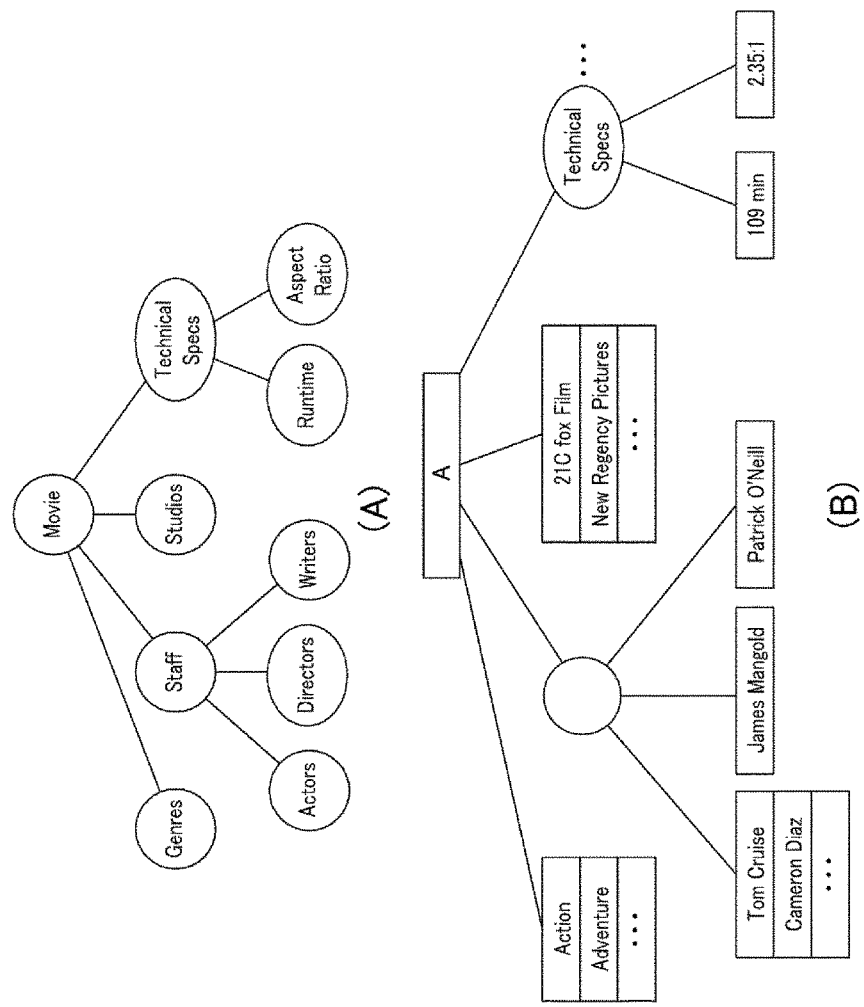
FIG. 3 provides diagrams for describing an exemplary structure of a domain ontology in which metadata is mapped in accordance with an illustrative embodiment of the present inventive concept.

By way of example, FIG. 3 provides diagrams for describing an exemplary structure of a domain ontology in which metadata is mapped in accordance with an illustrative embodiment of the present inventive concept.

FIG. 3(a) illustrates a domain ontology predefined for the category of "movie", which means a certain object falls into the "movie" category. As can be seen in FIG. 3(a), "genres," "staff," "studios," "technical specs" and so forth are defined as lower-level classes of the "movie."

The metadata indexing unit 120 in accordance with an illustrative embodiment maps metadata of the object onto the predefined domain ontology.

To elaborate, the metadata indexing unit 120 acquires, from the database 110 in which metadata 111 is stored for each object. Then, after acquiring the domain ontology 121 corresponding to the category, the metadata indexing unit 120 maps factual descriptors included in the metadata onto the corresponding classes of the domain ontology corresponding to the category.

By way of example, FIG. 3(b) illustrates the domain ontology corresponding to the category of "movie", on which the metadata related to the movie 'A' is mapped by the metadata indexing unit 120.

That is, as depicted in FIG. 3(b), after mapping the metadata of the movie "A" onto the domain ontology, factual descriptors of the metadata, such as "action" and "adventure" can be mapped to the class of "genre".

Referring back to FIG. 1, the metadata indexing unit 120 generates a metadata index based on the domain ontology on which the metadata for each object is mapped, and then stores the generated metadata index.

To be specific, the metadata indexing unit generates a metadata index by matching at least one piece of object identification information (e.g., the ID, the content name, etc.) to each factual descriptor stored for each category of the domain ontology. That is, plural pieces of object identification information including the same factual descriptor are mapped to the factual descriptor and stored.

The semantic data indexing unit 130 may be configured to extract semantic descriptors from user-generated text data and generate a semantic data index for each semantic descriptor. The semantic descriptor may be used as a search criterion when performing a consensus search in accordance with an illustrative embodiment.

The semantic indexing unit 130 divides into segments the text data of an electronic document that describes at least one object and is retrieved from the database 110. Then, after extracting at least one semantic descriptor from the segmented text data, the semantic data indexing unit 130 generates a semantic data index by matching the object and the segmented text data to the extracted semantic descriptor.

The semantic data indexing unit 130 may divide the user-generated text data 112 into a number of semantic segments on a basis of semantic unit. The semantic unit or the unit of meaning may refer to a minimal number of words, phrases, clauses, sentences or paragraphs having a semantic relation of belonging to the same category. An electronic document may be logically divided into plural segments based on the units of meaning.

A sentence may include a multiple number of such segmented text data. By way of example, the sentence "Although the actors are good, the scenario is lack of reality" can be divided into two semantic units that are different from each other: "although the actors are good" and "the scenario is lack of reality." Accordingly, the sentence can be divided into segmented text data that are different from one another.

Further, the text data may be divided into segments so that the each segmented text data includes at least one paragraph, at least one sentence, at least one clause, at least one phrase, or at least one word.

Meanwhile, the sentence "Although iPhone 4 has a good design, its call quality is not so good" can be divided into two different semantic units of "although iPhone 4 has a good design" and "its call quality is not so good." Accordingly, the sentence can also be divided into segmented text data that are different from one another.

Dividing such text data into the semantic units may be performed by using a well-known natural language processing algorithm whose detailed description wouldn't need to be provided here.

For example, FIG. 4 is a diagram for describing an exemplary structure of semantic segments in accordance with an illustrative embodiment.

FIG. 4 illustrates an example in which the semantic data indexing unit 130 generates semantic segments by acquiring user-generated text data, including film synopsis data, first user's review data, and second user's review data, generated for each of the movie contents 'Knight and Day' and 'Inception' among contents belonging to the category of 'movie.'

FIG. 4 also shows generating the semantic segments by dividing the user-generated text data (i.e., documents) on a basis of "sentences", a sort of semantic units.

However, the semantic data indexing unit 130 in accordance with an illustrative embodiment may also be configured to generate semantic segments by dividing the user-generated text data (i.e., document) on a basis of 'phrases' or 'clauses' in order to improve the accuracy of the semantic search.

To use 'phrases' or 'clauses' as a minimum or elementary semantic unit, the semantic data indexing unit 130 in accordance with an illustrative embodiment of the present inventive concept may divide the text at conjunctions or distinguish affirmatively stated parts from negatively stated parts of the text. When the elementary semantic unit is 'phrase' or 'clause' distinguished by conjunctions, relationships between words in a semantic segment gets tighter even when the user-generated text data includes phrases or clauses of opposite meanings in a single sentence. Accordingly, in case that search keywords (i.e., a query: hereinafter, 'search keywords' can simply refer to 'query') given by the user includes words indicating subjective information as well as factual information, a semantic search can be performed based on finding the semantic segment most correlated with the words within the search keywords.

Further, the semantic data indexing unit 130 stores the semantic segments generated for respective contents after matching the semantic segments to their identification information (hereinafter, referred to as 'semantic segment identification information').

FIG. 4 shows that the semantic data indexing unit 130 generates numbers (1, 2, 3, . . . 4) to be used as identification information for each semantic segment (i.e., semantic segment identification information) by numbering the semantic segments for each object according to a sentence order. The semantic segment identification information may be generated in other various forms such as IDs.

Referring back to FIG. 1, the semantic data indexing unit 130 extracts a number of semantic descriptor by dividing each semantic segment into words.

The semantic data indexing unit 130 then generates a semantic data index matching at least one of the object identification information in which each semantic descriptor is included and the semantic segment identification information.

The semantic data indexing unit 130 in accordance with an illustrative embodiment of the present inventive concept generates the semantic data index after preprocessing each semantic descriptor by using the language ontology 132. The language ontology 132 is an ontology that supports natural language interface for the data or information extracted from text, word bundle, or the like. The preprocessing of words may include stop word removal, stemming, and so forth.

By way of example, FIG. 5 provides diagrams illustrating semantic data indices in accordance with an illustrative embodiment.

As shown in FIG. 5(a), the semantic data indexing unit 130 assigns identification information (denoted as 'ID' in FIG. 5) to each object. The semantic data indexing unit 130 may use the same identification information as the one given to each object by the metadata indexing unit 120. That is, the metadata indexing unit 120 and the semantic data indexing unit 130 assign one and the same identification information to the same object. FIG. 5(a) shows that when the category of the object is 'movie,' 'M1042' to 'M1045' are assigned as IDs to movies 'A' to 'D' respectively.

The semantic data indexing unit 130 matches, based on the semantic descriptors extracted from user-generated text data for each object, the corresponding object identification information and semantic segment identification information for each object, and then stores them.

In FIG. 5(a), the object including 'Wichita' (P51), as one of the semantic descriptors, is movie 'B' (P53). The diagram shows that 'Wichita' is included in semantic segments numbered '2, 3' (P54) of the movie 'B'.

Referring back to FIG. 1, the semantic searching unit 140 performs the consensus search process for the inputted search keywords by using the metadata index and the semantic data index, and outputs the retrieved object information. The search keywords may be inputted by the user on a web site such as a search portal site or the like and can be inputted in the form of sentence, clause, phrase, word, or the like. Beyond just searching for objective facts, such as "Who are the actors that appear in the movie A?", the consensus search can retrieve the best results for a question such as "What is the most interesting action movie?" of which answer may depend on user's subjective opinions and for which no correct answer exists.

To elaborate, as depicted in FIG. 2, the semantic searching unit 140 in accordance with an illustrative embodiment may include a search word preprocessing module 141, a search word extending module 142 and a semantic search module 143.

The search word preprocessing module 141 extracts search keywords by dividing the query words given by the user into words and performs preprocessing such as stop word removal or stemming on the extracted search keywords.

The search word preprocessing module 141 may be configured to process the query by dividing the inputted query into semantic segments when the inputted query includes at least one minimum semantic unit. The search keywords preprocessing unit 141 in accordance with an illustrative embodiment of the present inventive concept may divide the search keywords into search keywords semantic segments in the same way as the semantic data indexing unit 130 does.

The search word extending module 141 generates an extended keyword by performing a concept-extending process on the search keywords. The search word extending module 142 may extend the search keywords by using the language ontology 132. The language ontology 132 may be a concept additionally including a dictionary-based extending method. The search word extending module 142 may generate extended keywords by extending each search keyword to at least one of the synonyms, hyponyms and hypernyms of the each search keyword.

Figure 6:
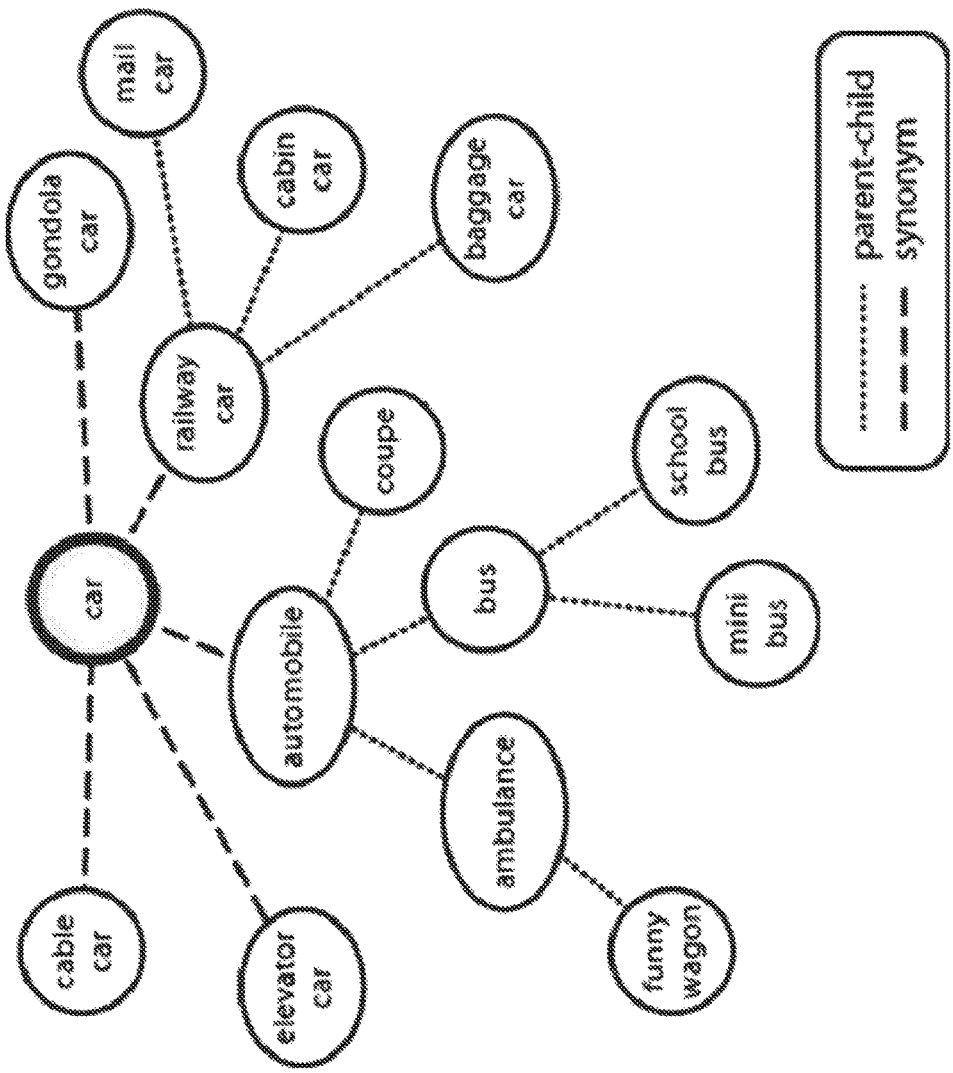
FIG. 6 is a diagram for explaining a method for extending search keywords in accordance with an illustrative embodiment.

By way of example, FIG. 6 is a diagram for explaining a method for extending search keywords in accordance with an illustrative embodiment.

FIG. 6 illustrates an example of generating a multiple number of extended key words (cable car, automobile, railway, etc.) by extending the concept of a single search key word 'car.'

Referring back to FIG. 2, the semantic search module 143 extracts at least one object having high relation to the search keywords, i.e., the processed query words given by the user by using the semantic data index or the meta data index, and determines the extracted object as a search result object. Then, the semantic search module 143 outputs the information of the search result object onto display or the like for the user to be informed of it. The semantic search module 143 may output the search result, and user-generated text data itself or linking information related to the search result.

The semantic search module 143 in accordance with an illustrative embodiment of the present inventive concept may determine the search result object by using either or both of the metadata index and the semantic data index according to the property of the search keywords inputted by the user. That is, the semantic search module 143 may determine the search result object by using at least one of the degree of direct relation between the inputted search keywords and the object (i.e., the degree of relation between the search keywords and the metadata) and the degree of indirect relation between the search keywords and user opinion information (i.e., the degree of relation between the search keywords and the user-generated text data). The semantic search module 143 may determine the search result object by imposing higher weight on either one of the direct relation and the indirect relation.

The properties of the search keywords mean the type of the information of the words included in the search keywords, which means, in accordance with an illustrative embodiment, whether factual information or subjective information is represented. By way of example, when the query is 'movies of director A,' the query words may be divided into 'movie', 'director', and 'A'. And 'A' and 'director' generally belong to the factual information type. When the query is 'movies showing outstanding sensitivity of director A,' the query words may be divided to 'movie,' 'show,' 'outstand,' 'sensitivity' and 'director', and 'A'. And 'sensitivity' and 'outstared' generally belong to subjective information type.

In case that the search keywords inputted to the semantic search module 143 in accordance with an illustrative embodiment of the present inventive concept only includes factual information, objects suitable for the search keywords are searched for by using the metadata index. On the other hand, in case that the search keywords inputted to the semantic search module 143 only includes subjective information, objects suitable for the search keywords are searched for by using the semantic data index. In case that the search keywords inputted to the semantic search module 143 includes both factual information and subjective information, objects suitable for the search keywords are searched for by using both the meta data index and the semantic data index.

To elaborate, the semantic search module 143 may be configured to first search for the object by using either one of the metadata index and the semantic data index. Then, if the semantic search module 143 fails to get suitable results for the search keywords, it may search for the object using the other one of the metadata index and the semantic data index.

Then the semantic search module 143 outputs objects referred by the object identification information included in the metadata search index as a search result.

The semantic search module 143, after searching for the object suitable for the same search keywords by using both the metadata index and the semantic data index, may determine the search result object by applying either the same weights or different weights to the metadata index and the semantic data index.

By way of example, the semantic search module 143 may determine objects also included in the metadata index (or the semantic data index) as the search result objects among the objects extracted based on the semantic data index (or the metadata index). Alternatively, the semantic search module 143 may, at first, try to determine the object extracted based on the semantic data index (or the metadata index) as the search result object.

First, a search method by the semantic search module 143 based on the metadata index will be discussed.

The semantic search module 143 in accordance with an illustrative embodiment of the present inventive concept extracts factual descriptors matched to at least one of the search keywords and the extended keywords from the metadata index. Then, the semantic search module 143 generates metadata search index which are the extracted factual information descriptors and their corresponding object identification information from the elements (entries) included in the metadata index.

Then the semantic search module 143 outputs objects referred by the objet identification information included in the metadata search index as a search result.

Now, a search method by the semantic search module 143 based on the semantic data index will be explained.

The semantic search module 143 in accordance with an illustrative embodiment of the present inventive concept extracts semantic descriptors matched to the search keywords and the extended keyword from the semantic data index, and generates semantic search index which are object identification information for the extracted semantic descriptor and their corresponding semantic segment identification information for each object.

Figures 7, 8:
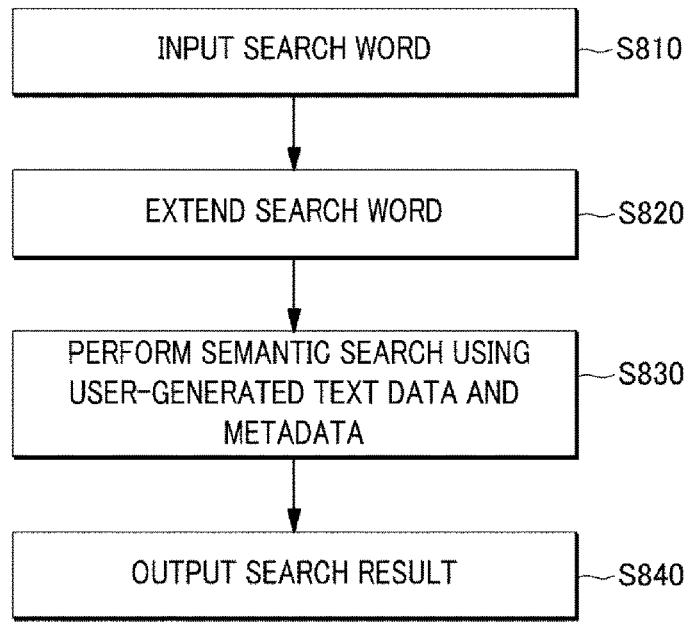
FIG. 7 is a diagram illustrating semantic search indices in accordance with an illustrative embodiment.
FIG. 8 is a flowchart for describing a semantic search method using user-generated text data.

By way of example, FIG. 7 is a diagram illustrating semantic search indices in accordance with an illustrative embodiment.

In FIG. 7, there is shown an example semantic search index generated when the user queries 'Tom Cruise movie good for a date'.

First, the search word preprocessing module 141 extracts search keywords by dividing the query words 'Tom Cruise movie good for a date' into search keywords 'Tom,' 'Cruise,' 'movie,' and 'date.'

Then, the search word extending module 142 performs keyword extension for each of the extracted search keywords and generates extended keywords such as 'film,' 'motion-picture,' and 'go out.'

Then, the semantic search module 143 extracts, from the semantic data index, semantic descriptors matched to the search keywords 'Tom,' 'Cruise,' 'movie,' and 'date' and the extended keywords 'film,' 'motion-picture,' and 'go out'.

Then, the semantic search module 143 extracts, from the semantic data index, the corresponding object identification information and the semantic segment identification information for each object for each of the extracted semantic descriptors 'Tom,' 'Cruise,' 'movie,' 'date,' 'film,' 'motion-picture,' and 'go out'.

Thereafter, as shown in FIG. 7, the semantic search module 143 generates the semantic search index by matching the extracted object identification information and the semantic segment identification information for the extracted semantic descriptors.

And the semantic search module 143, for each of the semantic descriptors included in the semantic search index, calculates the degree of relation between each of the search keywords and the objects.

To elaborate, the semantic search module 143 may output an intersection of the semantic descriptors included in the semantic search index with the objects and the semantic segments, and give a relation score to the intersection of the objects and the semantic segments.

When calculating the relation scores, the semantic search module 143 in accordance with an illustrative embodiment of the present inventive concept may assign different weights to the semantic descriptors matched to the search keywords from those to the semantic descriptors matched to the extended keywords. The semantic search module 143 may give higher weights to the objects and the semantic segments corresponding to the search keywords compared to those to the objects and the semantic segments corresponding to the extended keywords.

By way of example, FIG. 7 is illustrating that the semantic search module 143 extracted the object identification information 'M1043' as the intersection for 'Tom,' 'Cruise,' 'movie' and 'date' which are the semantic descriptors matched to the search keywords among those included in the semantic search index, and then extracts '[2, 13]' as the intersection from the semantic segments matched to 'M1043.'

Also, the semantic search module 143 extracts content identification information 'M1042' as the intersection for 'film,' and 'go out' which are the semantic descriptors matched to the extended keywords among those included in the semantic search index, and then extracts '[5]' as the intersection from the semantic segment identification information matched to 'M1042.'

In the above description, it is assumed that the query words given by the user include only one minimum semantic unit. When the query words include more than one minimum semantic unit, the search word preprocessing module 141 divides the query words into a multiple number of search keyword semantic segments. Then, the search word extending module 142 extends each of the search keyword semantic segments. Thereafter, the semantic search module 143 can process the query for each of the extended search keyword semantic segments in the same manner as described above.

By way of example, a query of 'movie of which scenario was good but acting of actors was worst' includes two search keyword semantic segments that express opposite sentiments of 'good scenario' and 'worst acting.' The object identification information and the semantic segment identification information obtained for each of the search keyword semantic segments may be gathered up by obtaining an intersection of the object identification information and then obtaining a union of the semantic segments for the same object or content.

Upon the completion of the above process, the semantic search module 143 assigns relation scores to the extracted objects according to the number of the semantic segments for the each extracted object. The semantic search module 143 in accordance with an illustrative embodiment of the present inventive concept may calculate the relation score for each extracted object based on a topological distance method.

By way of example, the semantic search module 143 in accordance with an illustrative embodiment of the present inventive concept may define the score a value of '1' in the case of a semantic segment extracted using the search keywords, whereas set the score a value of '0.5' which is smaller than '1' in the case of a semantic segment extracted using the extended keywords. That is, different weights are assigned to the search keywords and the extended keywords. Accordingly, in FIG. 7, 2 points are allotted to the object identification information 'M1043,' whereas 0.5 point is allotted to 'M1042.'

FIG. 7 illustrates an example in which the semantic search module 143 outputs objects for 'M1043' and 'M1042' as search results for the query words inputted by the user. The semantic search module 143 may output the search results in the order of 'M1043' and 'M1042.' That is, the semantic search module 143 may generate the search result information in such a way as to allow the user to distinguish the most suitable object 'M1043' and the second most adequate object 'M1042' for the query inputted by the user.

Such a semantic search result ranking method in accordance with an illustrative embodiment of the present inventive concept is a method for determining the ranks based on users' opinions and is fundamentally different from a conventional search result ranking method only depending on similarity to user's search keywords.

Further, when determining the ranks of the semantic search results, if at least one word included in a query inputted by a user (i.e., the search keywords and the extended keywords) expresses sentiment, the semantic search module 143 in accordance with an illustrative embodiment of the present inventive concept may apply different weights to semantic segments including the corresponding keywords depending on the polarity and the degree of the sentiment. By way of example, assume that the query inputted by the user is 'movie good for a date.' In such a case, among the semantic data index of the movie category, a weight applied to the semantic segment including 'the best' may be set to be higher than a weight applied to the semantic segment including 'good.' Although both of the semantic descriptors 'the best' and 'good' have a positive polarity, the semantic descriptor 'the best' expresses users' opinion more strongly. Thus, a higher weight may be applied to the semantic segment including the semantic descriptor "the best' among the semantic data index of the movie category.

Further, it may be also possible to assign an extra point or a weight additionally by further considering the authority of the web site posting the text data from which the segment data is extracted, the famousness of the author, the recency of the text data, and/or the evaluation on the text data such as the number of user's recommendation. By way of example, information upon famous authors or famous web sites in the corresponding field may be previously stored, and when the segment data is matched to such information, an extra point may be granted to that segment data. Furthermore, different weights may be assigned based on information on when the text data is posted. Further, an extra point may be granted by additionally considering recommendation information or evaluation information for the text data, such as "yy number of users like this text data among xx number of users."

In this way, the semantic search module 143 outputs, from the semantic search index, at least one of object identification information related to the search keywords inputted by the user. Then, the semantic search module 143 extracts a preset number of object identification information in the descending order of the relation score from the outputted object identification information. Then, the semantic search module 143 outputs objects according to the at least one object identification information as a search result.

The semantic search module 143 in accordance with an illustrative embodiment of the present inventive concept outputs as a search result, among the objects whose score is calculated based on the semantic search index, at least one of the object extracted from the objects extracted in the order of the highest score of relation with the search keywords and the objects included in the metadata search index. Below, a consensus search method in accordance with an illustrative embodiment will be described in detail with reference to FIG. 8.

FIG. 8 is a flowchart for describing a semantic search method using user-generated text data.

First, when a user inputs a query (S810), the inputted search keywords are extended (S820).

To elaborate, search keywords are extracted by dividing the inputted query into words, and extended keywords are generated by extending the generated search keywords to at least one concept of synonyms, hyponyms and hypernyms of the search keywords by using the language ontology. The query words inputted by the user may be composed of the unit of words, phrases, clauses and/or sentences.

Thereafter, a semantic search using at least one of user-generated text data and metadata is performed based on at least one of the search keywords and the extended keywords (S830).

In the step S830, the objects having high relation with the search keywords and the extended keywords are searched by using semantic data index generated based on the user-generated text data for respective objects and the metadata index generated by mapping the metadata for each object onto the domain ontology.

The semantic data index and the metadata index may be generated by the method as described above through FIGS. 1 to 7.

To elaborate, in step S830, there is generated a semantic search index based on the semantic descriptors matched to the search keywords and the extended keywords among the semantic descriptors for each semantic data index. Further, there is generated a metadata search index based on the factual descriptors matched to the search keywords and the extended keywords among the semantic descriptors for each metadata index. The semantic search index is in the form in which at least one of object identification information and semantic segment identification information for each object are matched for each semantic descriptor. The metadata search index is in the form in which at least one of object identification information is matched to each factual descriptor.

Like so, in step S830 for searching for an object suitable for the search keywords by using at least one of the semantic search index and the metadata search index may be performed by the method as described through FIGS. 1 to 7.

Thereafter, information of the objects retrieved as a result of performing the semantic search as described above by using the user-generated text data and the metadata is generated and outputted to the user (S840).

By way of non-limiting example, the information of the result objects may be generated in the form of a web page or the like.

Meanwhile, in an illustrative embodiment of the present inventive concept described in FIGS. 1 to 8, the metadata is described as factual information related to the objects. In an illustrative embodiment of the present inventive concept, the semantic search may be performed by using object-related factual information further including data extracted from the objects as factual information related to the objects.

By way of example, when the category of an object is digital contents related to movie, music, or the like, the object-extracted data may be acquired by analyzing the object itself. For example, image analysis, voice analysis, music mood analysis, extraction of musical instrument, and the like can be performed. Such object-extracted data may include an object-extracted descriptor. Further, in an illustrative embodiment of the present inventive concept, object-extracted data indexing as well as metadata indexing can be performed. The semantic searching unit 140 may perform the semantic search based on the metadata index, the object-extracted data index, and the semantic data index.

The above description of an illustrative embodiment of the present inventive concepts is provided for the purpose of illustration, and it would be understood by those skilled in the art that various changes and modifications may be made without changing technical conception and essential features of an illustrative embodiment of the present inventive concepts. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of an illustrative embodiment of the present inventive concept. It shall be understood that all modifications and embodiments conceived from the meaning and scope of the claims and their equivalents are included in the scope of the inventive concept.

What is claimed is:

1. A consensus search device comprising:
a processor dividing text data of an electronic document written about at least one content object into segments of segmented text data, which refer to a predetermined minimal number of words, phrases, clauses, sentences or paragraphs, extracting at least one semantic descriptor from each of the segments of the segmented text data, and generating a semantic data index matching each of the extracted semantic descriptors to the content object and the each of the segments of the segmented text data; and
retrieving a query object related to a query, based on the semantic data index, wherein the text data is divided into the segments by units of meaning, the semantic descriptor is at least one word that has a meaning, and the content object represents a topic or an entity that a user intends to describe in the electronic document,
wherein the processor:
generates at least one search keyword by dividing the query into words,
generates extended keywords including at least one of a synonym, a hyponym and a hypernym of the search keywords,
searches a semantic descriptor from each keyword and searches segmented text data included in the query object corresponding to the each semantic descriptor based on the semantic data index,
detects first searched objects of which identification information is identical among all of the searched the content object included in the search for and the semantic descriptors and extracts some segmented text data of which identification information is identical among all of the segmented text data included in the first searched objects,
if there are, in the query, two semantic descriptors corresponding to the keywords of which sentiments are opposite, detects second searched objects of which identification is identical among all of the searched the content object included in the search for and the two semantic descriptors and extracts all of the segmented text data in the second searched objects for the two semantic descriptors,
gives a score to the each of the first and second searched objects depending on a number of the extracted segmented text data, and assigns a weight to the first and second searched objects matched to the semantic descriptor corresponding to the search keywords higher than a weight to a searched object matched to the semantic descriptor corresponding to the extended keywords, and
outputs the first and second searched objects as a search result in a descending order of the score.

2. The consensus search device of claim 1, wherein:
the processor extracts a factual descriptor related to the content object from metadata included in the electronic document, and generates a metadata index matching identification information of the content object to the extracted factual descriptor, and
retrieves at least one the query object related to the query by using either or both of the semantic data index and the metadata index.

3. The consensus search device of claim 1, wherein the text data is divided into the segments by paragraphs, sentences, clauses, phrases, or words.

4. The consensus search device of claim 3, wherein the each segmented text data includes at least one paragraph, at least one sentence, at least one clause, at least one phrase, or at least one word.

5. The consensus search device of claim 1, wherein the text data is divided into the segments based on conjunctions or based on parts representing positive sentiment and parts representing negative sentiment.

6. The consensus search device of claim 1, wherein when the query includes a word expressing sentiment, the processor assigns different weights to the query object matched to the semantic descriptors expressing sentiment based on at least one of polarity and degree of the sentiment.

7. The consensus search device of claim 1, wherein the processor assigns an extra point based on at least one of an author of the segmented text data, the website on which the text data is posted, time point when the text data is posted and information of users' evaluation upon the text data.

8. The consensus search device of claim 1, wherein the processor generates the search keywords by dividing the query based on units of meaning, and the units of meaning are at least one of sentences, clauses, phrases and words.

9. A method for generating an index for consensus search, the method comprising:
(a) dividing text data of an electronic document written about at least one content object into segments of segmented text data, which refer to a predetermined minimal number of words, phrases, clauses, sentences or paragraphs;
(b) extracting at least one semantic descriptor from each segment of the segmented text data;
(c) generating a semantic data index matching each of the extracted semantic descriptor to the content object and the each segment of the segmented text data; and
(d) retrieving a query object related to a query, based on the semantic data index, wherein in the process of (a), the text data is divided into the segments by units of meaning, the semantic descriptor is at least one word that has a meaning, and the content object represents a topic or an entity that a user intends to describe in the electronic document,
wherein the process of (d) comprises:
(d1) generating at least one search keyword by dividing the query into words, (d2) generating extended keywords including at least one of a synonym, a hyponym and a hypernym of the search keywords, (d3) searching a semantic descriptor from each keyword and searching segmented text data included in the query object corresponding to the each semantic descriptor based on the semantic data index, (d4) detecting first searched objects of which identification information is identical among all of the searched the content objects for included in the search and the semantic descriptors and extracting some segmented text data of which identification information is identical among all of the segmented text data included in the first searched objects, (d5) if there are, in the query, two semantic descriptors corresponding to the keywords of which sentiments are opposite, detecting second searched objects of which identification is identical among all of the searched the content objects for included in the search and the two semantic descriptors and extracting all of the segmented text data in the second searched objects for the two semantic descriptors, (d6) giving a score to the each of the first and second searched objects depending on a number of the extracted segmented text data, wherein a weight to the first and/or second searched object matched to the semantic descriptor corresponding to the search keywords is set higher than a weight to the first and/or second searched object matched to the semantic descriptor corresponding to the extended keywords, and (d7) outputting the first and second searched objects as a search result in a descending order of the score.

10. The method of claim 9, further comprising:
(e) extracting a factual descriptor related to the content object from metadata included in the electronic document; and
(f) generating a metadata index matching identification information of the content object to the extracted factual descriptor.

11. The method of claim 9,
wherein in the process of (a), the text data is divided into the segments by paragraphs, sentences, clauses, phrases, or words.

12. The method of claim 9,
wherein the each segmented text data includes at least one paragraph, at least one sentence, at least one clause, at least one phrase, or at least one word.

13. The method of claim 9,
wherein in the process of (a), the text data is divided into the segments based on conjunctions or based on parts representing positive sentiment and parts representing negative sentiment.

14. A consensus search method comprising:
(a) providing a semantic data index by dividing and indexing an electronic document describing at least one content object into segments, which refer to a predetermined minimal number of words, phrases, clauses, sentences or paragraphs; and (b) retrieving a query object related to a query based on the semantic data index, wherein the semantic data index is generated by extracting at least one semantic descriptor from the each segmented text data, and matching each of the extracted semantic descriptor to the content object and the each segmented text data, wherein the text data is divided into the segments by units of meaning, the semantic descriptor is at least one word that has a meaning, and the content object represents a topic or an entity that a user intends to describe in the electronic document, wherein the process of (b) comprises:
(b1) generating at least one search keyword by dividing the query into words,
(b2) generating extended keywords including at least one of a synonym, a hyponym and a hypernym of the search keywords,
(b3) searching a semantic descriptor from each keyword and searching segmented text data included in the content object corresponding to the each semantic descriptor based on the semantic data index,
(b4) detecting first searched objects of which identification information is identical among all of the searched the content objects for included in the search and the semantic descriptors and extracting some segmented text data of which identification information is identical among all of the segmented text data included in the first searched objects,
(b5) if there are, in the query, two semantic descriptors corresponding to the keywords of which sentiments are opposite, detecting second searched objects of which identification is identical among all of the searched the content objects for included in the search and the two semantic descriptors and extracting all of the segmented text data in the second searched objects for the two semantic descriptors,
(b6) giving a score to the each of the first and second searched objects depending on a number of the extracted segmented text data, wherein a weight to the first and/or second searched object matched to the semantic descriptor corresponding to the search keywords is set higher than a weight to the first and/or second searched object matched to the semantic descriptor corresponding to the extended keywords, and
(b7) outputting the first and second searched objects as a search result in a descending order of the score.

15. The consensus search method of claim 14,
wherein in the process of (b4), when the query includes a word expressing sentiment, the semantic searcher assigns different weights to the query object matched to the semantic descriptors expressing sentiment based on at least one of polarity and degree of the sentiment.

16. The consensus search method of claim 14,
wherein in the process of (b4), assigning an extra point based on at least one of an author of the segmented text data, a website on which the text data is posted, time point when the text data is posted and information of users' evaluation upon the text data.

* * * * *

UNITED STATES PATENT AND TRADEMARK OFFICE
CERTIFICATE OF CORRECTION

PATENT NO. : 9,679,001 B2
APPLICATION NO. : 13/899786
DATED : June 13, 2017
INVENTOR(S) : Jaewoo Kang Page 1 of 1

It is certified that error appears in the above-identified patent and that said Letters Patent is hereby corrected as shown below:

In the Specification

Column 8, Line 31, replace "outstared" with -- outstand --.

Signed and Sealed this
Twenty-fourth Day of October, 2017

Joseph Matal
*Performing the Functions and Duties of the
Under Secretary of Commerce for Intellectual Property and
Director of the United States Patent and Trademark Office*